US009172135B2

(12) United States Patent
Sudo et al.

(10) Patent No.: US 9,172,135 B2
(45) Date of Patent: Oct. 27, 2015

(54) HORIZONTAL RADIATION ANTENNA

(75) Inventors: Kaoru Sudo, Nagaokakyo (JP); Hirotaka Fujii, Nagaokakyo (JP); Eiichi Kobayashi, Nagaokakyo (JP); Toshiro Hiratsuka, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 13/415,567

(22) Filed: Mar. 8, 2012

(65) Prior Publication Data

US 2012/0229343 A1 Sep. 13, 2012

(30) Foreign Application Priority Data

Mar. 9, 2011 (JP) ................................ 2011-051492

(51) Int. Cl.

| | |
|---|---|
| ***H01Q 1/38*** | (2006.01) |
| ***H04Q 9/04*** | (2006.01) |
| ***H01Q 21/08*** | (2006.01) |
| ***H01Q 19/00*** | (2006.01) |

(Continued)

(52) U.S. Cl.

CPC ............... *H01Q 1/38* (2013.01); *H01Q 9/0407* (2013.01); *H01Q 19/005* (2013.01); *H01Q 19/28* (2013.01); *H01Q 21/08* (2013.01)

(58) Field of Classification Search

CPC ......... H01Q 1/38; H01Q 1/48; H01Q 9/0407; H01Q 19/005; H01Q 19/28; H01Q 19/30
USPC ........... 343/700 MS, 755, 829, 841, 846, 912
See application file for complete search history.

(56) References Cited

U.S. PATENT DOCUMENTS

| | | | | |
|---|---|---|---|---|
| 7,154,441 | B2 * | 12/2006 | Hansen et al. | 343/700 MS |
| 7,372,408 | B2 * | 5/2008 | Gaucher et al. | 343/700 MS |
| 8,482,473 | B2 | 7/2013 | Huang | |

(Continued)

FOREIGN PATENT DOCUMENTS

| | | | |
|---|---|---|---|
| EP | 2276114 | A1 | 1/2009 |
| JP | 06-204734 | | 7/1994 |
| JP | 2004172875 | A | 6/2004 |
| JP | 2007-311944 | A | 11/2007 |
| JP | 2009109194 | A | 5/2009 |
| JP | 2011024183 | A | 2/2011 |

OTHER PUBLICATIONS

William Deal et al.; "A New Quasi-Yagi Antenna for Planar Active Antenna Arrays"; IEEE Transactions on Microwave Theory and Techniques, vol. 48. Issue 6; pp. 910-918; Jun. 2000.

(Continued)

*Primary Examiner* — Robert Karacsony
*Assistant Examiner* — Daniel J Munoz
(74) *Attorney, Agent, or Firm* — Studebaker & Brackett PC

(57) ABSTRACT

This disclosure provides a horizontal radiation antenna including a grounded conductor plate on the back surface of a multilayer substrate, a radiation element to which a microstrip line is connected on a front surface of the multilayer substrate, and a passive element on an end portion side of the multilayer substrate compared with the radiation element. An intermediate grounded conductor plate is provided within the multilayer substrate between insulation layers and faces the microstrip line. The intermediate grounded conductor plate defines a notch portion whose end portion side is open. The intermediate grounded conductor surrounds the radiation element and the passive element in the notch portion. The intermediate grounded conductor is electrically connected to the grounded conductor plate.

5 Claims, 11 Drawing Sheets

(51) Int. Cl.
*H01Q 19/28* (2006.01)
*H01Q 9/04* (2006.01)

(56) References Cited

U.S. PATENT DOCUMENTS

2007/0262828 A1* 11/2007 Fujita .............................. 333/26
2011/0012805 A1 1/2011 Huang
2011/0032155 A1* 2/2011 Yanagi et al. .......... 343/700 MS
2011/0057853 A1* 3/2011 Kim et al. ..................... 343/843
2011/0063187 A1* 3/2011 Huang .......................... 343/893
2011/0133991 A1* 6/2011 Lee et al. ............... 343/700 MS
2012/0098706 A1* 4/2012 Lin et al. ................ 343/700 MS

OTHER PUBLICATIONS

An Office Action "Notification of Reasons for Rejection" issued by the Japanese Patent Office on Apr. 30, 2013, which corresponds to Japanese Patent Application No. JP2011-051492 and is related to U.S. Appl. No. 13/415,567; with translation.
The first Office Action issued by the State Intellectual Property Office of People's Republic of China on Dec. 3, 2013, which corresponds to Chinese Patent Application No. 201210056974.2 and is related to U.S. Appl. No. 13/415,567; with translation.

* cited by examiner

HORIZONTAL RADIATION ANTENNA

CROSS REFERENCE TO RELATED APPLICATIONS

The present application claims priority to Japanese Patent Application No. 2011-051492 filed on Mar. 9, 2011, the entire contents of which are incorporated herein by reference.

FIELD OF THE INVENTION

The present invention relates to a horizontal radiation antenna suitable for use for a high-frequency signal such as a microwave, a millimeter wave, or the like, for example.

BACKGROUND

As a horizontal radiation antenna of the related art, in W. R. Deal, N. Kaneda, J. Sor, Y. Qian, and T. Itoh, "A New Quasi-Yagi Antenna for Planar Active Antenna Arrays", IEEE Trans. Microwave Theory Tech., June 2000, Vol. 48, No. 6, pp. 910-918 (hereafter, "Doc 1"), a configuration is described in which, while a feeding line, an unbalance-balance converter electrode (hereinafter, referred to as a balun electrode), a radiation element, a passive element, and the like are formed on the front surface of a dielectric substrate, a grounded conductor plate is formed on the back surface of the dielectric substrate.

In addition, in Japanese Unexamined Patent Application Publication No. 6-204734 (hereafter, "Doc 2"), a configuration is described in which, while a microstrip line used for power feeding and a conductive body cover are provided on the front surface of a dielectric substrate, a grounded conductor plate is provided on the back surface of the dielectric substrate. In this case, the leading end portion of the microstrip line is located on the end portion side of the dielectric substrate and electrically connected to the grounded conductor plate. In addition, while the conductive body cover is formed in a substantially box shape, one end side of which is open, and surrounds the leading end portion of the microstrip line, the peripheral portion thereof is electrically connected to the grounded conductor using a plurality of conductor pins. In addition, in cooperation with the end edge of the grounded conductor plate, the conductive body cover configures a slot whose length is about a half wavelength in a direction parallel to the dielectric substrate.

Furthermore, in Japanese Unexamined Patent Application Publication No. 2007-311944 (hereafter, "Doc 3"), a configuration is described in which, while, on the front surface of a dielectric substrate, a ground electrode is provided that has a notch portion whose end portion side is open, a feeding electrode is provided within the notch portion of the ground electrode. In this case, a slot line is formed owing to the outer peripheral edge of the feeding electrode and the inner peripheral edge of the ground electrode.

SUMMARY

The present disclosure provides a horizontal radiation antenna capable of being downsized and suppressing the leak of electric power.

In one aspect of the disclosure, a horizontal radiation antenna includes a substrate including an insulating material, a conductor plate on a back surface side of the substrate and configured to be connected to ground, an elongated radiation element on a front surface side of the substrate, facing the conductor plate, and spaced from the conductor plate, a feeding line including a conductor pattern on the front surface side of the substrate and connected to the radiation element, and at least one passive element on the substrate and located on an end portion side of the substrate compared with the radiation element. The passive element extends in parallel with the radiation element and is insulated from the conductor plate and the radiation element. The horizontal radiation antenna includes an intermediate conductor plate at a position facing the feeding line and on the front surface side of the substrate, compared with the conductor plate, and configured to be connected to ground. A level difference is formed between the intermediate conductor plate and the conductor plate, and a distance dimension between the conductor plate and the radiation element is larger than a distance dimension between the intermediate conductor plate and the conductor pattern of the feeding line.

In a more specific embodiment, the intermediate conductor plate may include a substantially U-shaped frame portion surrounding the radiation element and the passive element in a substantially U-shaped form in a state in which the end portion side of the substrate is open.

In another more specific embodiment, the feeding line may be configured using a microstrip line including a strip conductor where the conductor pattern is provided on the front surface of the substrate.

In yet another more specific embodiment, the substrate may include a multilayer substrate in which a plurality of insulation layers are laminated, the conductor plate, the radiation element, and the intermediate conductor plate are at positions different from one another with respect to a thickness direction of the multilayer substrate, and plural vias penetrate one of the plural insulation layers located between the conductor plate and the intermediate conductor plate and electrically connect the conductor plate and the intermediate conductor plate.

Other features, elements, and characteristics, as well as advantages of the present disclosure will become more apparent from the following detailed description of exemplary embodiments with reference to the attached drawings.

DETAILED DESCRIPTION

Figure 1:
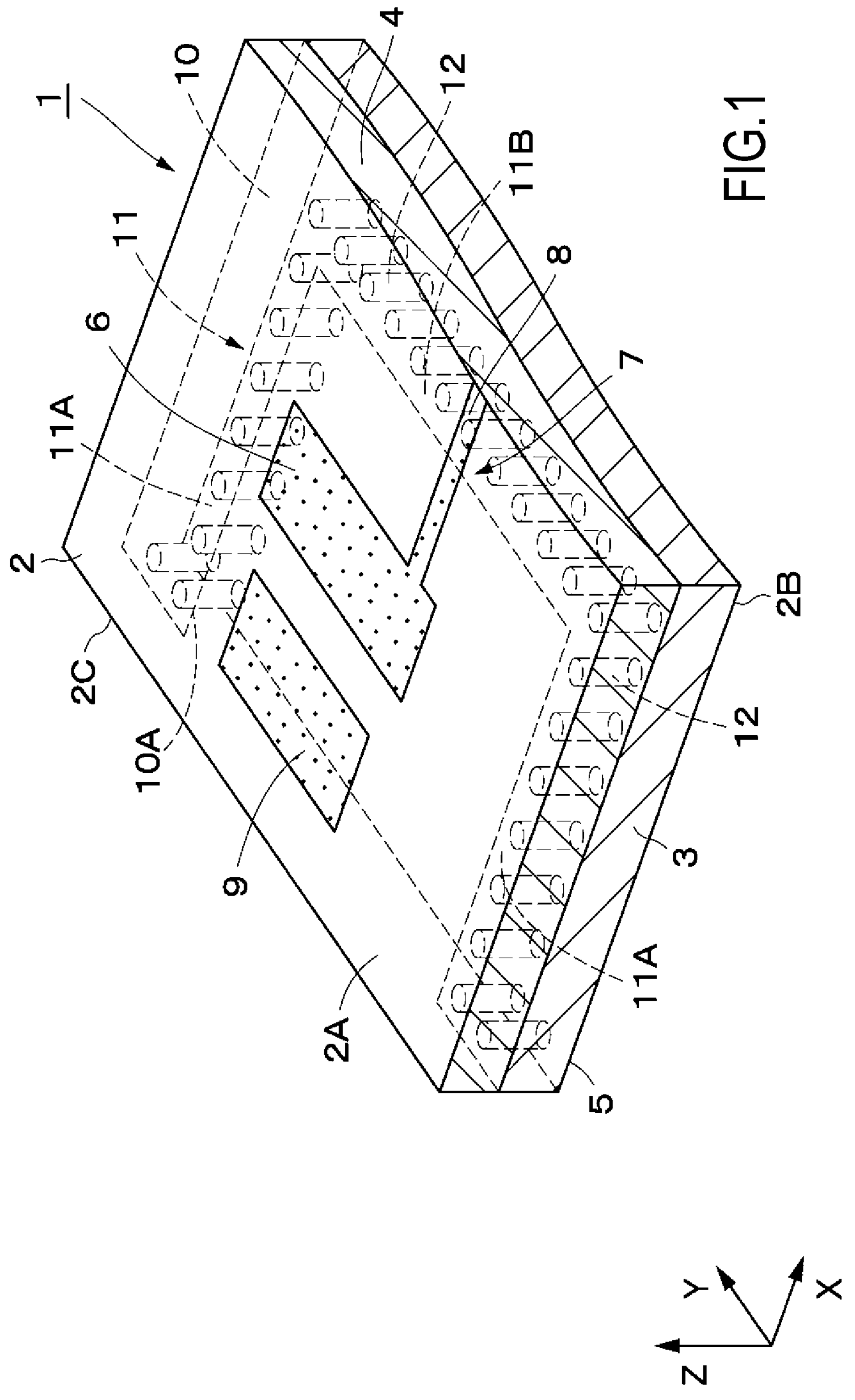
FIG. 1 is a perspective view illustrating a horizontal radiation antenna according to a first exemplary embodiment.

The inventors realized that because in the antenna based on Doc 1, the balun electrode is formed in the feeding line, and in addition to this, the balun electrode is configured using two substantially U-shaped electrodes extending in a direction perpendicular to a direction in which the feeding line extends, it is necessary to maintain a space used for forming the balun electrode, and the whole antenna tends to easily become large in size.

In addition, in the antenna based on Doc 2, it is necessary to provide the conductive body cover independently of the dielectric substrate. Therefore, there occurs a problem that, while the antenna becomes large in size in the thickness direction of the dielectric substrate, a manufacturing cost increases with the structure thereof being complicated. Furthermore, while the peripheral portion of the conductive body cover is electrically connected to the grounded conductor plate using the plural conductor pins, it is hard to dispose a conductor pin at a position through which the microstrip line to be a feeding line passes. Therefore, there also occurs a problem that electric power leaks from a portion of the conductor cover, located around the microstrip line.

In addition, in the antenna based on Doc 3, a configuration is adopted in which, while the feeding electrode and the ground electrode are provided on the front surface of the dielectric substrate, the ground electrode is also provided on the back surface of the dielectric substrate. However, within the dielectric substrate, no configuration is provided that prevents an electromagnetic wave from propagating. Therefore, there is a problem that an electromagnetic wave of a parallel plate mode is formed between the ground electrode on a front surface side and the ground electrode on a back surface side and the electromagnetic wave propagates within the dielectric substrate, thereby causing electric power to leak.

Hereinafter described with reference to accompanying drawings are exemplary embodiments of a horizontal radiation antenna according to the present disclosure, with the antenna used in about a 60 GHz band as but one example.

FIG. 1 to FIG. 4 illustrate a horizontal radiation antenna 1 according to a first exemplary embodiment. This horizontal radiation antenna 1 includes a multilayer substrate 2, a grounded conductor plate 5, a radiation element 6, a passive element 9, an intermediate grounded conductor plate 10, and the like, which are to be hereinafter described.

The multilayer substrate 2 is formed in a substantially plate shape extending parallel to an X axis direction and a Y axis direction, for example, from among the X axis direction, the Y axis direction, and a Z axis direction, perpendicular to one another. This multilayer substrate 2 can have a width dimension of about several mm with respect to the Y axis direction that corresponds to a width direction, for example, and can have a length dimension of about several mm with respect to the X axis direction that corresponds to a length direction, for example. In addition, the multilayer substrate 2 can have a thickness dimension of about several hundred μm with respect to the Z axis direction that corresponds to a thickness direction, for example.

In addition, the multilayer substrate 2 can include two insulation layers 3 and 4, laminated in the Z axis direction so as to be headed from a back surface 2B side to a front surface 2A side. For example, each of the insulation layers 3 and 4 can be formed in a thin layer using a resin material having an insulation property whose relative permittivity is about 4. For example, the thickness dimension of the multilayer substrate 2 can be set to about 700 μm. In addition, the insulation layers 3 and 4 of the multilayer substrate 2 are not limited to the resin material, and may also be formed using ceramic materials having insulation properties.

For example, the grounded conductor plate 5 can be formed using a conductive metal thin film such as copper, silver, or the like, and connected to a ground. This grounded conductor plate 5 is located on the back surface of the insulation layer 3, and can cover approximately the whole surface of the multilayer substrate 2.

For example, the radiation element 6 is formed elongated, for example, in a substantially long and thin quadrangular shape, and can be composed of a similar conductive metal thin film as that of the grounded conductor plate 5. The radiation element 6 faces the grounded conductor plate 5 and is spaced therefrom. Specifically, the radiation element 6 is disposed on the front surface of the insulation layer 4. Between this radiation element 6 and the grounded conductor plate 5, the insulation layers 3 and 4 are disposed. Therefore, the radiation element 6 faces the grounded conductor plate 5 in a state in which the radiation element 6 is insulated from the grounded conductor plate 5.

Figure 2:
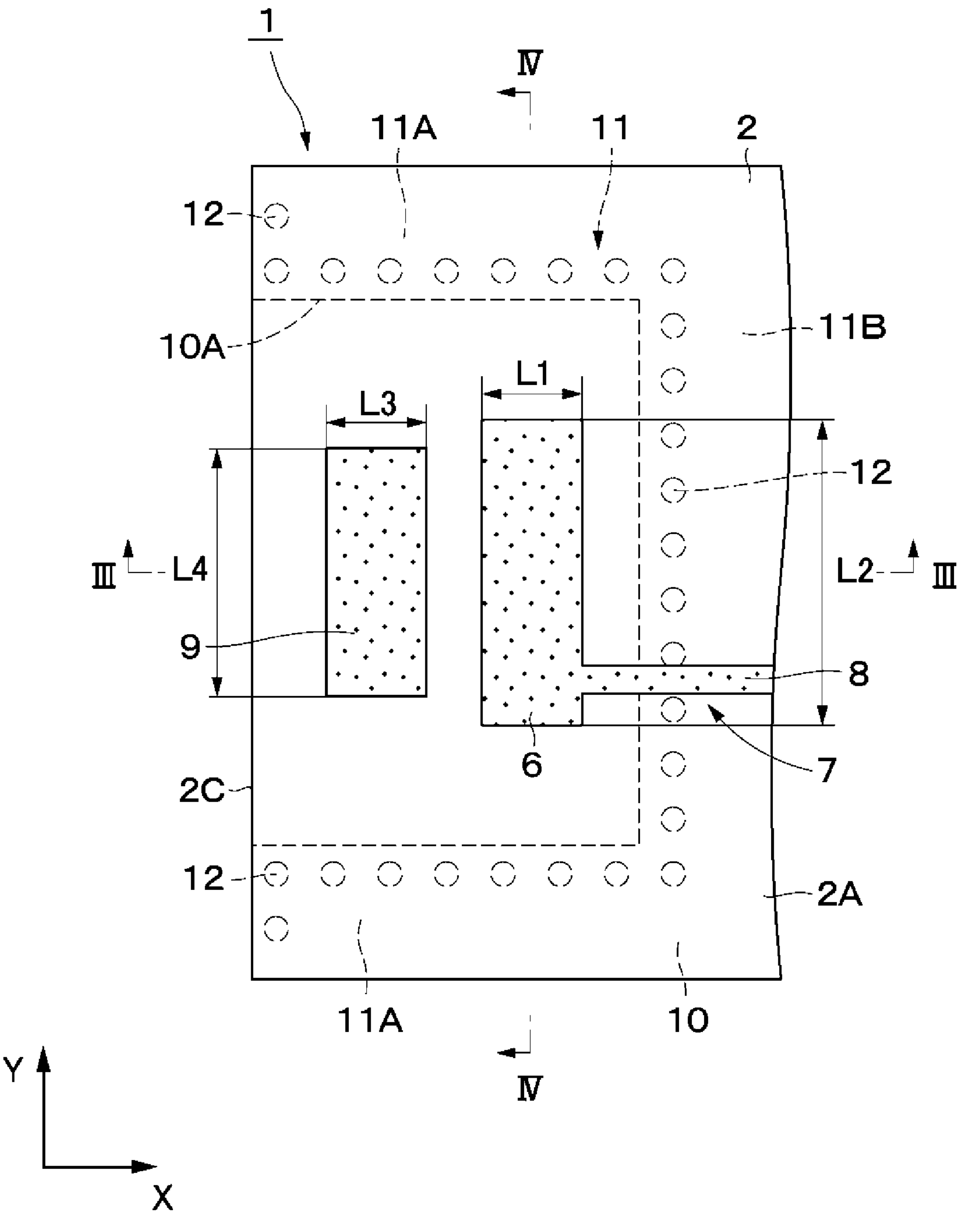
FIG. 2 is a plan view illustrating the horizontal radiation antenna in FIG. 1.
Figure 3:
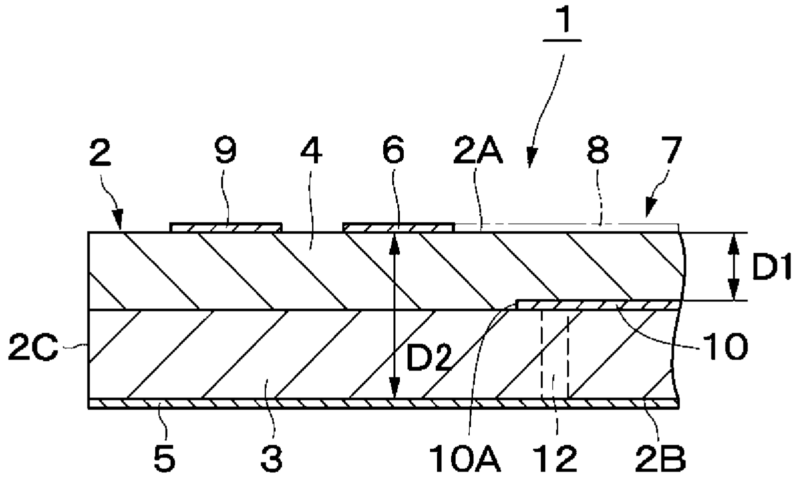
FIG. 3 is a cross-sectional view when the horizontal radiation antenna is viewed from a III-III direction indicated by arrows in FIG. 2.

In addition, as illustrated in FIG. 2, the radiation element 6 has a length dimension L1, which can be about several hundred μm (for example, L1=about 450 μm) with respect to the X axis direction, and has a width dimension L2, which can be about several hundred μm to about several mm (for example, L2=about 1450 μm) with respect to the Y axis direction. The width dimension L2 in the Y axis direction of this radiation element 6 can be a value larger than the length dimension L1, and can be set to a value corresponding to about the half wavelength of a used high-frequency signal in electrical length, for example.

Figure 4:
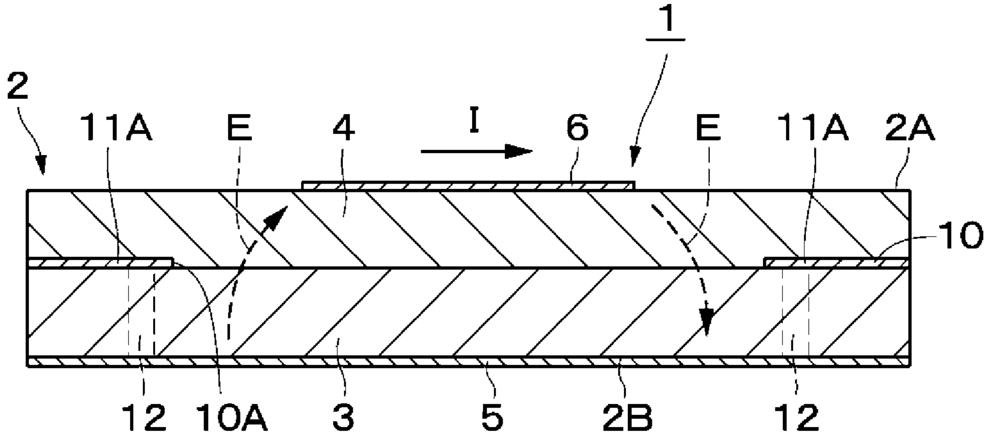
FIG. 4 is a cross-sectional view when the horizontal radiation antenna is viewed from a IV-IV direction indicated by arrows in FIG. 2.

Furthermore, a microstrip line 7 to be hereinafter described is connected to the halfway position of the radiation element 6 in the Y axis direction. In addition, as illustrated in FIG. 4, owing to power feeding from the microstrip line 7, a current I flows in the Y axis direction in the radiation element 6. An electric field E is formed between both end portion sides in the Y axis direction in the radiation element 6 and the grounded conductor plate 5.

As illustrated in FIG. 1 to FIG. 4, the microstrip line 7 configures a feeding line performing power feeding on the radiation element 6. Specifically, the microstrip line 7 is configured by a strip conductor 8, which is provided on the front surface of the insulation layer 4 and serves as a conductor pattern, and an intermediate grounded conductor plate 10, located between the insulation layers 3 and 4 and provided on the back surface of the insulation layer 4. In addition, for example, the strip conductor 8 can include a similar conductive metal material as that of the grounded conductor plate 5, and can be formed in an elongated, or substantially long and thin strip shape extending in the X axis direction. In addition, the leading end of the strip conductor 8 can be connected to the radiation element 6 at a halfway position located between a center position and an end portion position in the Y axis direction. In this specific embodiment, the leading end of the strip conductor 8 is connected to a position having an offset of about 550 μm from the center position in the Y axis direction, for example.

The passive element 9 can be formed in an elongated shape, for example, a substantially long and thin quadrangular shape using a similar conductive metal thin film as that of the radiation element 6, and disposed on the end portion side 2C of the multilayer substrate 2, which is located on a leading end side in the X axis direction when being viewed from the radiation element 6. A clearance gap is formed between this passive element 9 and the radiation element 6, and the passive element 9 extends in the Y axis direction in a state in which the passive element 9 is parallel to the radiation element 6. In addition, the passive element 9 is insulated from the radiation element 6, the grounded conductor plate 5, and the intermediate grounded conductor plate 10 to be hereinafter described.

In addition, the passive element 9 can have a length dimension L3 of about several hundred μm (for example, L3=about 450 μm) with respect to the X axis direction, and can have a width dimension L4 of about several hundred μm to about several mm (for example, L4=about 1150 μm) with respect to the Y axis direction. The width dimension L4 in the Y axis direction of this passive element 9 can be set to a value larger than the length dimension L3, and can be set to a value smaller than the width dimension L2 in the Y axis direction of the radiation element 6.

In addition, a magnitude relationship between the passive element 9 and the radiation element 6, the specific shapes thereof, the sizes thereof, and the like are not limited to the above-mentioned example, and may be arbitrarily set in response to the operating frequency band and the radiation pattern of the horizontal radiation antenna 1, the relative permittivity of the multilayer substrate 2, and the like. In addition, the passive element 9 causes electromagnetic field engagement with the radiation element 6 to occur, and functions as an inducer.

The intermediate grounded conductor plate 10 is located between the insulation layers 3 and 4 and provided within the multilayer substrate 2, and faces the grounded conductor plate 5. For example, this intermediate grounded conductor plate 10 can be formed using a conductive metal thin film, and electrically connected to the grounded conductor plate 5 using a plurality of vias 12 to be hereinafter described. Therefore, the intermediate grounded conductor plate 10 can be connected to the ground in a similar way as the grounded conductor plate 5.

In addition, the intermediate grounded conductor plate 10 is located at a position facing the strip conductor 8 of the microstrip line 7, and located on the front surface 2A side of the multilayer substrate 2, compared with the grounded conductor plate 5. In addition, a level or height difference is formed between the intermediate grounded conductor plate 10 and the grounded conductor plate 5. At this time, compared with a distance dimension D1 between the intermediate grounded conductor plate 10 and the strip conductor 8 of the microstrip line 7, a distance dimension D2 between the grounded conductor plate 5 and the radiation element 6 is large. That is, the distance D2 is larger. or much larger than the distance D1.

In addition, in the intermediate grounded conductor plate 10, a substantially quadrangular-shaped notch portion 10A is provided or positioned on the end portion side 2C of the multilayer substrate 2 and whose leading end side in the X axis direction is open (i.e., in the negative X axis direction of FIGS. 1 and 2). In planar view of the horizontal radiation antenna 1, the radiation element 6 and the passive element 9 are disposed within the notch portion 10A. In addition, a substantially U-shaped frame portion 11 is formed around the notch portion 10A to define the notch portion 10A and has a substantially U-shaped form that surrounds the radiation element 6 and the passive element 9. This substantially U-shaped frame portion 11 is configured by two arm portions 11A, which are disposed on both sides in the Y axis direction, or sides opposing one another, and sandwiching therebetween the notch portion 10A. The two arm portions 11A extend in the X axis direction, and a joining portion 11B that is located on the inner portion side of the notch portion 10A joins the two arm portions 11A to each other. The joining portion 11B is located on a base end side in the X axis direction, compared with the end portion 2C of the multilayer substrate 2.

For example, conductive metal material such as copper, silver, or the like can be provided in a through hole that penetrates the insulation layer 3 and whose internal diameter is of about several ten to about several hundred μm. Hence, each via 12 can be formed as a substantially columnar conductor. In addition, each of the vias 12 extends in the Z axis direction, and both end portions thereof are connected to the grounded conductor plate 5 and the intermediate grounded conductor plate 10, respectively. A distance dimension between two of the vias 12 adjacent to each other is set to a value smaller than about the quarter-wavelength of a used high-frequency signal in electrical length, for example. In addition, the plural vias 12 are disposed along the edge portion of the substantially U-shaped frame portion 11 so as to surround the notch portion 10A. Accordingly, the plural vias 12 form the wall surface of a level-difference portion between the intermediate grounded conductor plate 10 and the grounded conductor plate 5.

In addition, the plural vias 12 stabilize the electric potentials of the grounded conductor plate 5 and the intermediate grounded conductor plate 10, and also functions as a reflector reflecting a high-frequency signal headed from the notch portion 10A to the inside of the multilayer substrate 2. Therefore, the vias 12 inhibits the high-frequency signal from leaking into the inside of the multilayer substrate 2.

The horizontal radiation antenna 1 according to the present embodiment has such a configuration as described above, and the operation thereof will now be described.

First, when power is fed from the microstrip line 7 to the radiation element 6, the current I flows in the radiation element 6 so as to be headed in the Y axis direction. Accordingly, the horizontal radiation antenna 1 transmits or receives a high-frequency signal depending on the width dimension L2 of the radiation element 6.

Because the passive element 9 is provided in a state in which the passive element 9 is parallel to the radiation element 6, the radiation element 6 and the passive element 9 are electromagnetic-field-coupled to each other, and the current I also flows in the passive element 9 so as to be headed in the Y axis direction. Therefore, the passive element 9 functions as an inducer, it may be possible to obtain a directivity in the direction of the passive element 9 when being viewed from the radiation element 6, and it may be possible to radiate an electromagnetic wave from the end portion side 2C of the multilayer substrate 2 in a horizontal direction parallel to the multilayer substrate 2.

In addition, in the present embodiment, because the radiation element 6 is provided at a position facing the grounded conductor plate 5, radiation can occur in a state in which the grounded conductor plate 5 exists. Therefore, the balun electrode is not necessary that is described in Doc 1, it may be possible for the horizontal radiation antenna 1 to shorten a length dimension with respect to a power feeding direction (X axis direction) by about several mm (for example, about 2 mm), and it may be possible to establish downsizing.

In addition, in the antenna described in Doc 2, since the conductor cover is used, the structure becomes stereoscopic. On the other hand, since the horizontal radiation antenna 1 according to the present embodiment has a structure that may be formed in the multilayer substrate 2 in a substantially plane shape by sequentially stacking the grounded conductor plate 5, the insulation layer 3, the intermediate grounded conductor plate 10, the insulation layer 4, the radiation element 6, the passive element 9, and the like, the structure can be simplified.

In addition, a configuration is adopted in which the intermediate grounded conductor plate 10 is formed where the level, or a height difference is formed between the intermediate grounded conductor plate 10 and the grounded conductor plate 5 and the distance dimension D2 between the grounded conductor plate 5 and the radiation element 6 is large compared with the distance dimension D1 between the intermediate grounded conductor plate 10 and the strip conductor 8 of the microstrip line 7. More generally, the distance dimension D2 is larger than the distance dimension D1. Compared with the microstrip line 7 side, the confinement effect for an electromagnetic field is weak on the radiation element 6 side, and it may be easy for an electromagnetic wave to radiate. In addition to this, since the intermediate grounded conductor plate 10 is provided where the level differences are formed between the intermediate grounded conductor plate 10 and the grounded conductor plate 5 using the vias 12, these level-difference portions serve as a reflector. As a result, it may be possible to improve a characteristic of radiating to the end portion side 2C of the multilayer substrate 2, on which the passive element 9 is disposed when being viewed from the radiation element 6.

Furthermore, since an electromagnetic wave may be reflected by the level-difference portion between the grounded conductor plate 5 and the intermediate grounded conductor plate 10, it may be possible to prevent electric power from leaking into the inside of the multilayer substrate 2. In addition, the intermediate grounded conductor plate 10 faces the strip conductor 8 of the microstrip line 7 with sandwiching therebetween the insulation layer 4, and is electrically connected to the grounded conductor plate 5 using the vias 12, where the grounded conductor plate 5 is located on the opposite side of the strip conductor 8 with respect to the thickness direction. Therefore, unlike the antenna based on Doc 2, it may also be possible to provide the vias 12 at a position facing the strip conductor 8. Accordingly, in the surrounding portion of the strip conductor 8, it may also be possible to prevent electric power from leaking into the inside of the multilayer substrate 2.

In addition, because the intermediate grounded conductor plate 10 includes the substantially U-shaped frame portion 11 that surrounds, in a substantially U-shaped form, the radiation element 6 and the passive element 9 in a state in which the end portion side 2C of the multilayer substrate 2 is open, the level-difference portion between the grounded conductor plate 5 and the intermediate grounded conductor plate 10 is also formed in a substantially U-shaped form. Therefore, it may be possible to radiate an electromagnetic wave to the end portion side 2C of the multilayer substrate 2, on which the substantially U-shaped frame portion 11 is open, and in addition to this, it may be possible to prevent a radiation pattern from diverging into both end portion sides in the width direction (Y axis direction) in which the substantially U-shaped frame portion 11 is open. Accordingly, it may be possible to improve a characteristic of radiating to the direction of the passive element 9 when being viewed from the radiation element 6.

In addition, since a configuration is adopted in which electric power is fed to the radiation element 6 using the microstrip line 7 usually used in a high-frequency circuit, it may be possible to easily connect the high-frequency circuit and the antenna 1 to each other.

In addition, a configuration is adopted where the grounded conductor plate 5, the radiation element 6, the passive element 9, and the intermediate grounded conductor plate 10 are provided in the multilayer substrate 2 in which the plural insulation layers 3 and 4 are laminated. Therefore, while the grounded conductor plate 5 is provided on the back surface 2B of the multilayer substrate 2, and the radiation element 6 is provided on the front surface 2A of the multilayer substrate 2, the intermediate grounded conductor plate 10 is provided between the insulation layers 3 and 4. Accordingly, it may be possible to easily dispose the intermediate grounded conductor plate 10 between the grounded conductor plate 5 and the radiation element 6 with respect to the thickness direction. In addition to this, the grounded conductor plate 5 and the intermediate grounded conductor plate 10 are electrically connected to each other using the plural vias 12 penetrating the insulation layer 3 located between the grounded conductor plate 5 and the intermediate grounded conductor plate 10. Therefore, the plural vias 12 are disposed in the level-difference portion between the grounded conductor plate 5 and the intermediate grounded conductor plate 10, and using these vias 12, it may be possible to reflect an electromagnetic wave headed into the inside of the multilayer substrate 2. In addition, conductor patterns are formed in the insulation layers 3 and 4, via processing is performed on insulation layers 3 and 4, the plural insulation layers 3 and 4 are stacked, and hence it may be possible to form the horizontal radiation antenna 1. Therefore, it may be possible to easily apply the embodiment to a mass production line.

Figure 5:
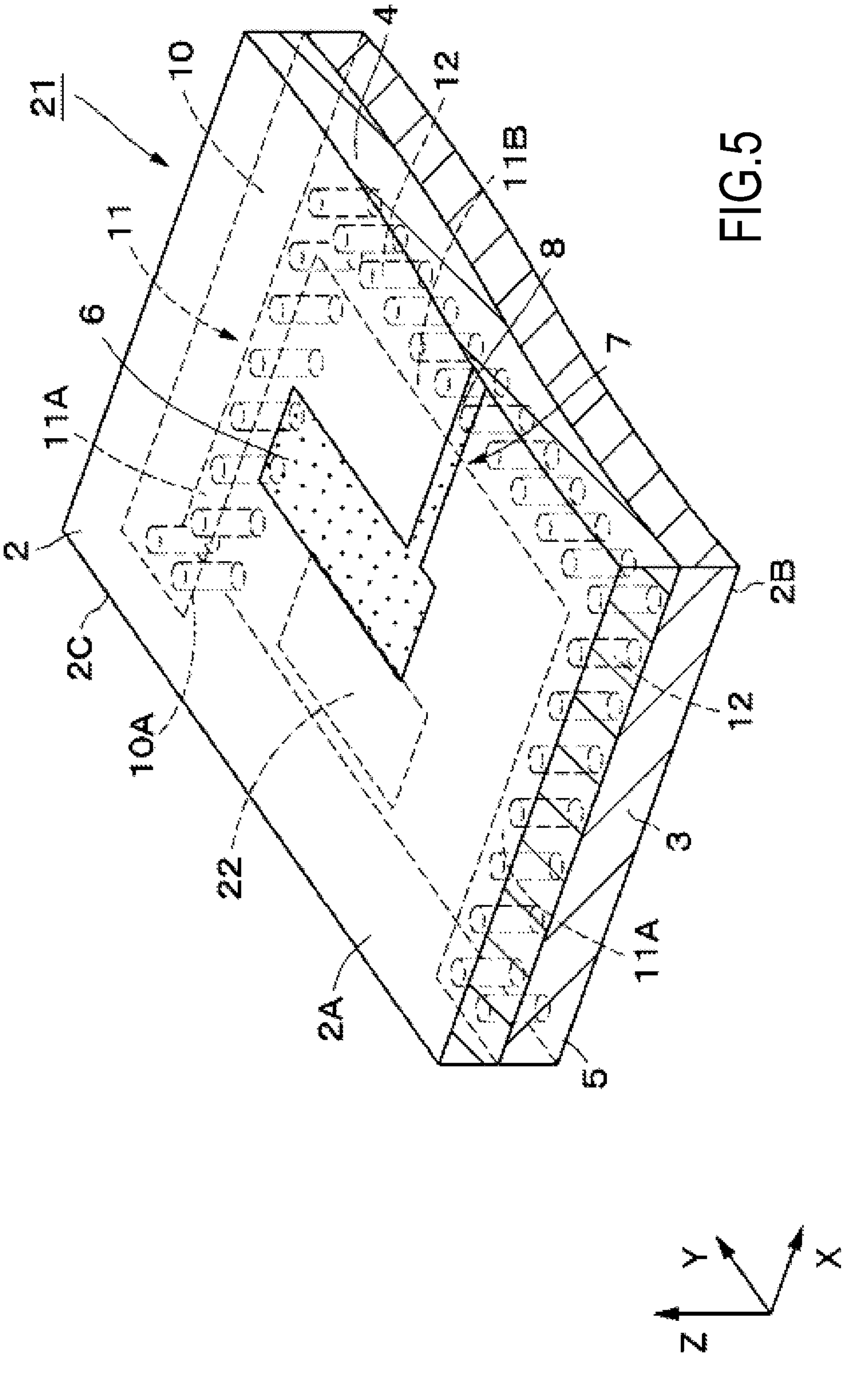
FIG. 5 is a perspective view illustrating a horizontal radiation antenna according to a second exemplary embodiment.
Figure 6:
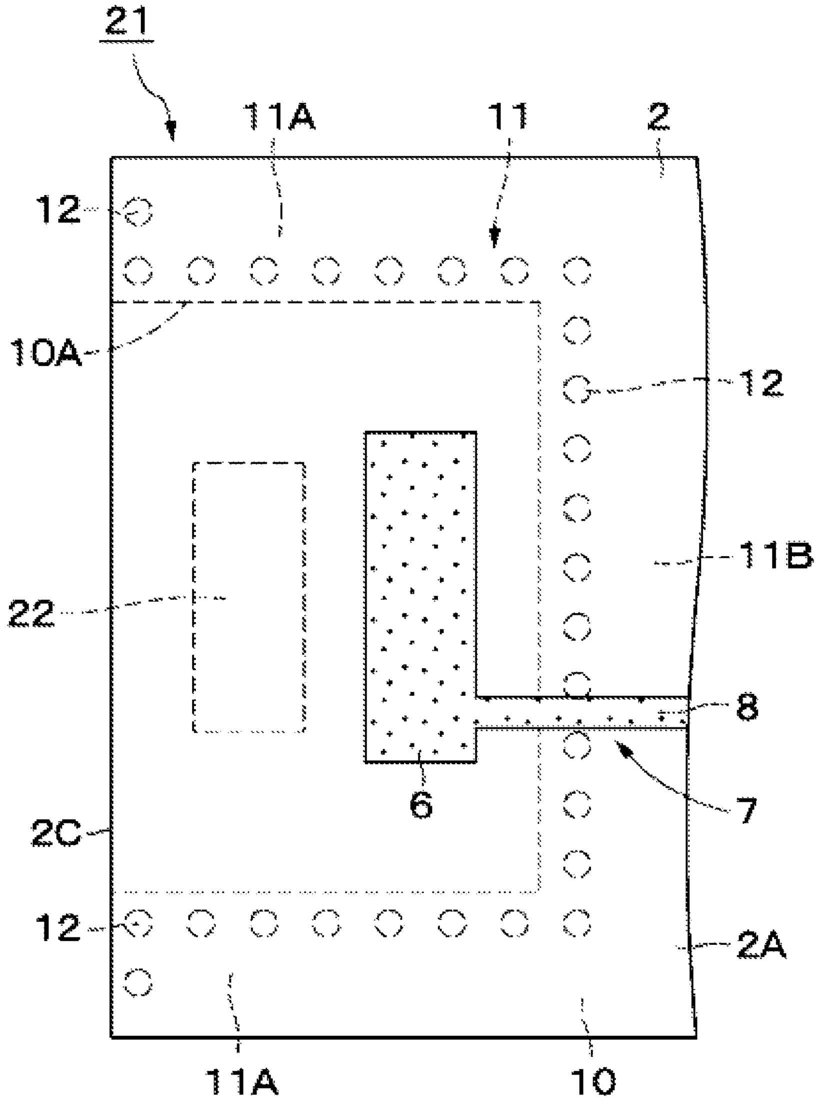
FIG. 6 is a plan view illustrating the horizontal radiation antenna in FIG. 5.
Figure 7:
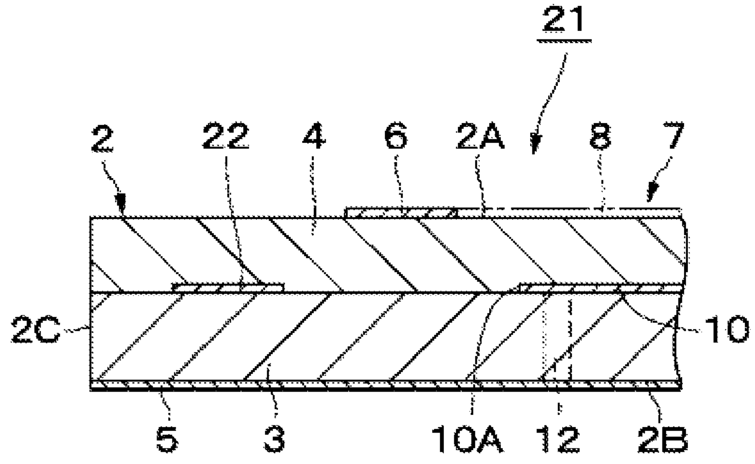
FIG. 7 is a cross-sectional view of a similar position as in FIG. 3, which illustrates the horizontal radiation antenna in FIG. 5.

Next, FIG. 5 to FIG. 7 illustrate a second exemplary embodiment. In addition, the feature of the present embodiment is a configuration in which a passive element and a radiation element are provided at positions different from each other with respect to the thickness direction. In addition, in the present embodiment, configuration elements having a same symbol as assigned a configuration element in the first embodiment are described above with respect to the first embodiment, and that description may not be repeated here.

A horizontal radiation antenna 21 according to the second exemplary embodiment includes a multilayer substrate 2, a grounded conductor plate 5, a radiation element 6, a passive element 22, an intermediate grounded conductor plate 10, and the like.

The passive element 22 is formed in approximately a similar way as the passive element 9 according to the first exemplary embodiment. Therefore, for example, the passive element 22 is formed in an elongated, or substantially long and thin quadrangular shape, can use a similar conductive metal thin film as that of the radiation element 6, and is provided on the end portion side 2C of the multilayer substrate 2 when being viewed from the radiation element 6. In addition, the passive element 22 extends in the Y axis direction in a state in which the passive element 22 is parallel to the radiation element 6.

In the present exemplary embodiment, however, the passive element 22 is located between the insulation layers 3 and 4 and provided within the multilayer substrate 2. In this regard, the passive element 22 is different from the passive element 9 provided on the front surface 2A of the multilayer substrate 2 according to the first exemplary embodiment. Additionally, the passive element 22 is insulated from the radiation element 6, the grounded conductor plate 5, and the intermediate grounded conductor plate 10. In addition, in planar view of the horizontal radiation antenna 21 (i.e., in a viewing direction normal to the surface 2A), the passive element 22 is disposed within the notch portion 10A along with the radiation element 6.

Accordingly, in the second exemplary embodiment, it may also be possible to obtain a similar function effect as the first exemplary embodiment. In particular, in the second embodiment, since the passive element 22 is disposed at a position different from the radiation element 6 with respect to the thickness direction, it may be possible to adjust the directivity of the horizontal radiation antenna 21 with respect to the thickness direction, for example, in response to the position of the passive element 22 with respect to the thickness direction.

In addition, in the second exemplary embodiment, a configuration is adopted in which the passive element 22 is provided on the back surface 2B side of the multilayer substrate 2, compared with the radiation element 6. However, preferred embodiments of the present invention are not limited to this example, and a configuration may be adopted in which the passive element is provided on the front surface side of the multilayer substrate, compared with the radiation element, for example. In this case, for example, an insulation layer may be provided that covers the radiation element, and a configuration may be adopted in which the passive element is provided on the front surface of this insulation layer. In addition, a configuration may also be adopted in which the passive element is provided at a position different from the intermediate grounded conductor plate with respect to the thickness direction.

Figure 8:
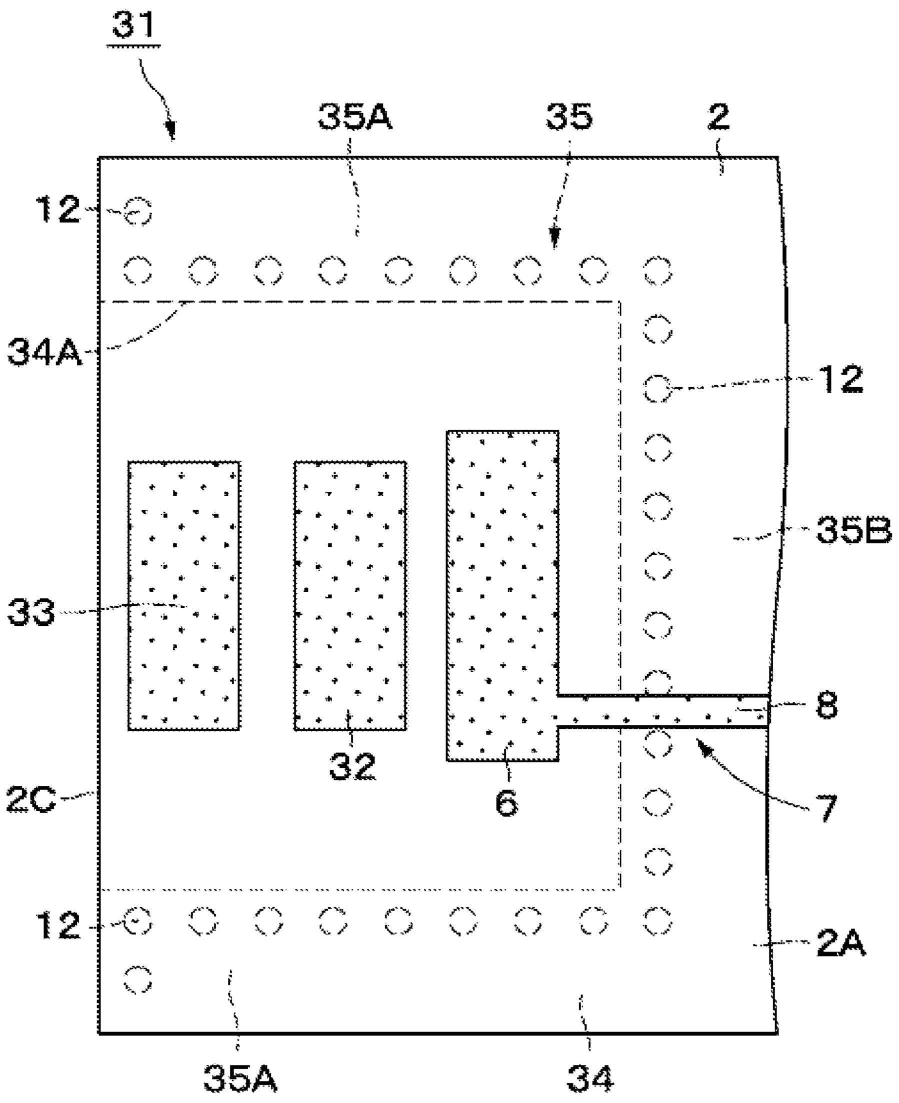
FIG. 8 is a plan view illustrating a horizontal radiation antenna according to a third exemplary embodiment.
Figure 9:
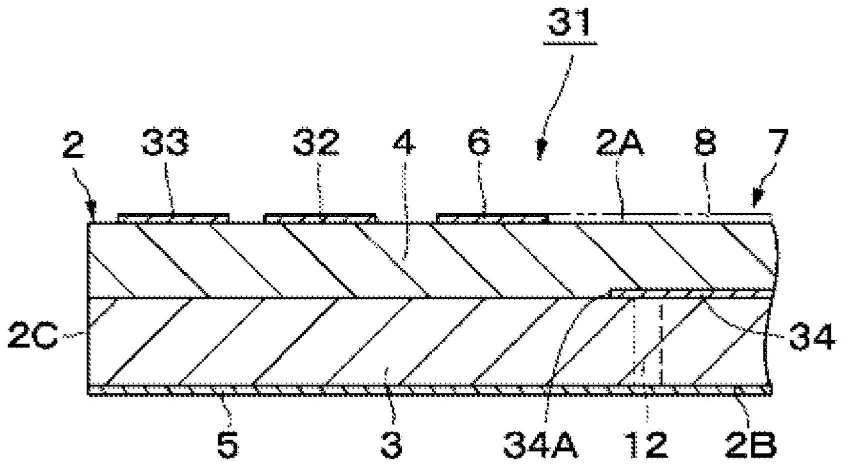
FIG. 9 is a cross-sectional view of a similar position as in FIG. 3, which illustrates the horizontal radiation antenna in FIG. 8.

Next, FIG. 8 and FIG. 9 illustrate a third exemplary embodiment. In addition, the feature of the present embodiment is a configuration in which a plurality of passive elements are provided. In addition, in the present embodiment, configuration elements having a same symbol as assigned a configuration element in the first embodiment are described above with respect to the first embodiment, and that description may not be repeated here.

A horizontal radiation antenna 31 according to the third embodiment includes a multilayer substrate 2, a grounded conductor plate 5, a radiation element 6, passive elements 32 and 33, an intermediate grounded conductor plate 34, and the like.

The first passive element 32 is formed in approximately a similar way as the passive element 9 according to the first exemplary embodiment. Therefore, for example, the first passive element 32 can be formed in an elongated, or substantially long and thin quadrangular shape, using a conductive metal thin film, and can be provided on the end portion side 2C of the multilayer substrate 2 when being viewed from the radiation element 6. In addition, a clearance gap is formed between the first passive element 32 and the radiation element 6, and the first passive element 32 extends in the Y axis direction in a state in which the first passive element 32 is parallel to the radiation element 6. In addition, the first passive element 32 is insulated from the radiation element 6, the grounded conductor plate 5, and the intermediate grounded conductor plate 34.

The second passive element 33 can be formed in approximately a similar way as the first passive element 32. Therefore, for example, the second passive element 33 can be formed in an elongated, or substantially long and thin quadrangular shape, using a conductive metal thin film, and disposed on the end portion side 2C of the multilayer substrate 2, compared with the first passive element 32. In addition, a clearance gap is formed between the second passive element 33 and the first passive element 32, the second passive element 33 extends in the Y axis direction in a state in which the second passive element 33 is parallel to the first passive element 32, and the second passive element 33 is disposed in parallel to the radiation element 6 and the first passive element 32. In addition, the second passive element 33 is insulated from the radiation element 6, the grounded conductor plate 5, the intermediate grounded conductor plate 34, and the first passive element 32.

The intermediate grounded conductor plate 34 is formed in approximately a similar way as the intermediate grounded conductor plate 10 according to the first exemplary embodiment. Therefore, the intermediate grounded conductor plate 34 is located between the insulation layers 3 and 4 and provided within the multilayer substrate 2, and faces the grounded conductor plate 5. This intermediate grounded conductor plate 34 is electrically connected to the grounded conductor plate 5 using plural vias 12. Therefore, the intermediate grounded conductor plate 34 is connected to the ground in a similar way as the grounded conductor plate 5.

In addition, the intermediate grounded conductor plate 34 is located at a position facing the strip conductor 8 of the microstrip line 7, and located on the front surface 2A side of the multilayer substrate 2, compared with the grounded conductor plate 5. In addition, a level or height difference is formed between the intermediate grounded conductor plate 34 and the grounded conductor plate 5. Compared with a distance dimension between the intermediate grounded conductor plate 34 and the strip conductor 8 of the microstrip line 7, a distance dimension between the grounded conductor plate 5 and the radiation element 6 is large. More generally, the distance dimension between the grounded conductor plate 5 and the radiation element 6 is larger than the distance dimension between the intermediate grounded conductor plate 34 and the strip conductor 8 of the microstrip line 7.

In addition, in the intermediate grounded conductor plate 34, a substantially quadrangular-shaped notch portion 34A is formed that is located on the end portion side 2C of the multilayer substrate 2 and whose leading end side in the X axis direction is open. In planar view of the horizontal radiation antenna 31, the radiation element 6 and the first and second passive elements 32 and 33 are disposed within the notch portion 34A. In addition, around the notch portion 34A, a substantially U-shaped frame portion 35 is formed that has a substantially U-shaped form and surrounds the radiation element 6 and the first and second passive elements 32 and 33. This substantially U-shaped frame portion 35 is configured by two arm portions 35A, which are disposed on both sides in the Y axis direction with sandwiching therebetween the notch portion 34A and extend in the X axis direction, and a joining portion 35B that is located on the inner portion side of the notch portion 34A and joins the two arm portions 35A to each other.

In addition, the plural vias 12 are disposed along the edge portion of the substantially U-shaped frame portion 35 so as to surround the notch portion 34A. Accordingly, the plural vias 12 form a wall surface of a level-difference portion between the intermediate grounded conductor plate 34 and the grounded conductor plate 5.

Accordingly, in the third exemplary embodiment, it may also be possible to obtain a similar function effect as the first exemplary embodiment. In particular, in the third embodiment, since the first and second passive elements 32 and 33 are provided on the end portion side 2C of the multilayer substrate 2 compared with the radiation element 6, it may be possible to adjust the directivity of the horizontal radiation antenna 31 in response to the dispositions, the shapes, the sizes, and the like of the first and second passive elements 32 and 33.

In addition, while, in the third exemplary embodiment, a configuration is adopted in which two passive elements 32 and 33 are provided, a configuration may also be adopted in which more than two passive elements are provided.

Figure 10:
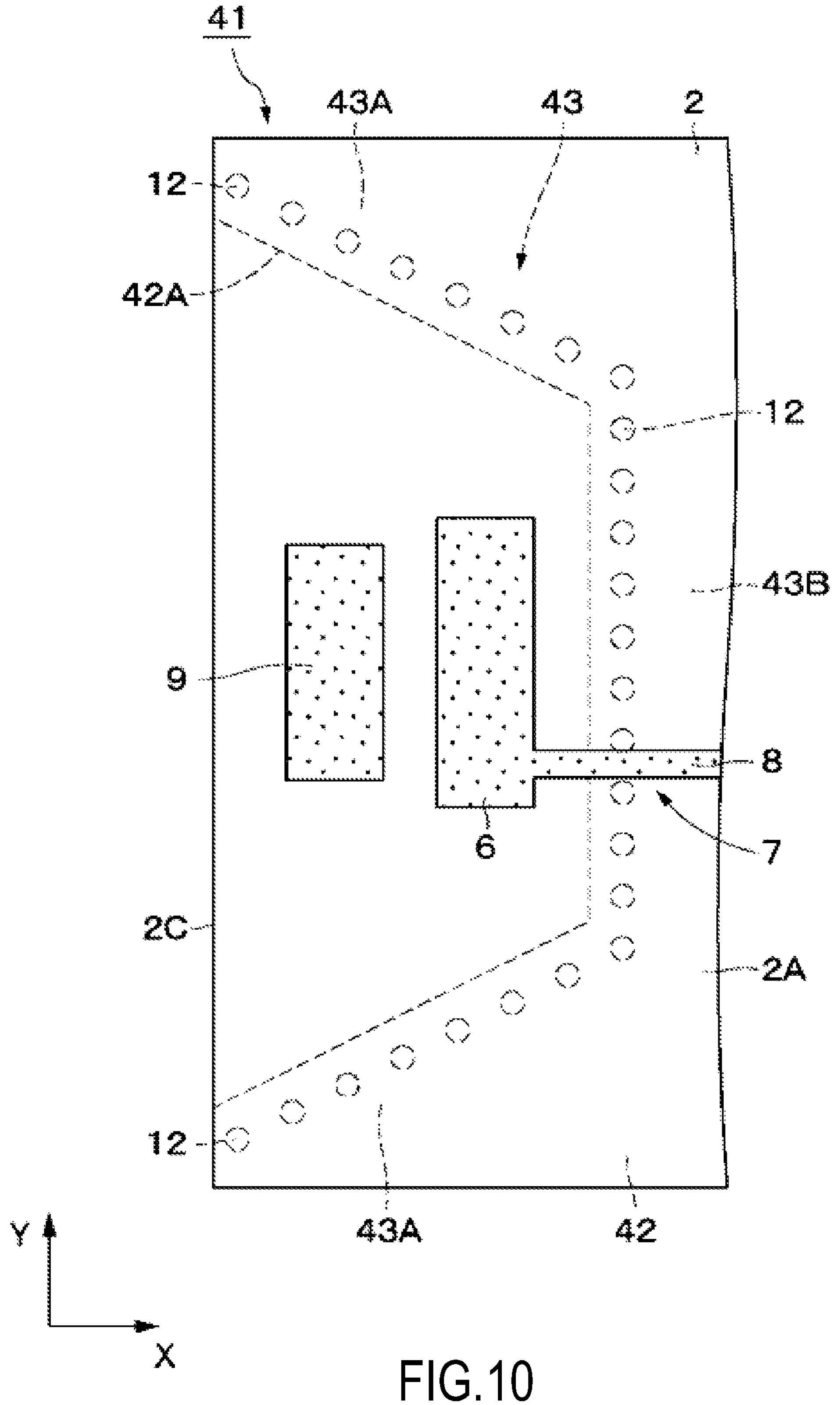
FIG. 10 is a plan view illustrating a horizontal radiation antenna according to a fourth exemplary embodiment.

Next, FIG. 10 illustrates a fourth exemplary embodiment. In addition, a feature of the present embodiment is that a notch portion forming a substantially U-shaped frame portion is formed in a substantially trapezoidal shape spreading outwardly toward the end portion side 2*c* of a substrate 2. In addition, in the present embodiment, configuration elements having a same symbol as assigned a configuration element in the first embodiment are described above with respect to the first embodiment, and that description may not be repeated here.

A horizontal radiation antenna 41 according to the fourth exemplary embodiment includes the multilayer substrate 2, a grounded conductor plate 5, a radiation element 6, a passive element 9, an intermediate grounded conductor plate 42, and the like.

The intermediate grounded conductor plate 42 is formed in approximately a similar way as the intermediate grounded conductor plate 10 according to the first exemplary embodiment. Therefore, the intermediate grounded conductor plate 42 is located between the insulation layers 3 and 4 and provided within the multilayer substrate 2, and faces the grounded conductor plate 5. This intermediate grounded conductor plate 42 is electrically connected to the grounded conductor plate 5 using plural vias 12. Therefore, the intermediate grounded conductor plate 42 is connected to the ground in a similar way as the grounded conductor plate 5.

In addition, the intermediate grounded conductor plate 42 is located at a position facing the strip conductor 8 of the microstrip line 7, and located on the front surface 2A side of the multilayer substrate 2, compared with the grounded conductor plate 5. In addition, a level or height difference is formed between the intermediate grounded conductor plate 42 and the grounded conductor plate 5. Compared with a distance dimension between the intermediate grounded conductor plate 42 and the strip conductor 8 of the microstrip line 7, a distance dimension between the grounded conductor plate 5 and the radiation element 6 is large, or more generally, the distance dimension between the grounded conductor plate 5 and the radiation element 6 is larger than the a distance dimension between the intermediate grounded conductor plate 42 and the strip conductor 8 of the microstrip line 7.

In addition, in the intermediate grounded conductor plate 42, a substantially trapezoidal-shaped notch portion 42A is formed that is located on the end portion side 2C of the multilayer substrate 2 and whose leading end side in the X axis direction is open. As for this notch portion 42A, compared with a bottom portion located on the central side of the multilayer substrate 2, the width dimension in the Y axis direction of an aperture portion located on the end portion side 2C of the multilayer substrate 2 is large. Namely, the notch portion 42A is broadened and open in a substantially tapered shape with drawing near to the end portion side 2C of the multilayer substrate 2.

In planar view of the horizontal radiation antenna 41 (i.e., in a viewing direction normal to the surface 2A), the radiation element 6 and the passive element 9 are provided within the notch portion 42A. In addition, around the notch portion 42A, a substantially U-shaped frame portion 43 is formed that has a substantially U-shaped form and surrounds the radiation element 6 and the passive element 9. This substantially U-shaped frame portion 43 is configured by two arm portions 43A, which are disposed on both sides in the Y axis direction with sandwiching therebetween the notch portion 42A and extend in the X axis direction, and a joining portion 43B that is located on the inner portion side of the notch portion 42A and joins the two arm portions 43A to each other. A distance dimension between the two arm portions 43A gradually increases with drawing near to, or in the direction of the end portion side 2C of the multilayer substrate 2.

In addition, the plural vias 12 surround the notch portion 42A and are disposed along the edge portion of the substantially U-shaped frame portion 43. Accordingly, the plural vias 12 form a wall surface of the level-difference portion between the intermediate grounded conductor plate 42 and the grounded conductor plate 5.

Accordingly, in the fourth exemplary embodiment, it may also be possible to obtain a similar function effect as the first embodiment. In particular, in the fourth embodiment, since the notch portion 42A forming the substantially U-shaped frame portion 43 is formed in the substantially trapezoidal shape, it may be possible to adjust the divergence characteristic of a radiation pattern with respect to the Y axis direction, in response to the shape of the notch portion 42A.

Figure 11:
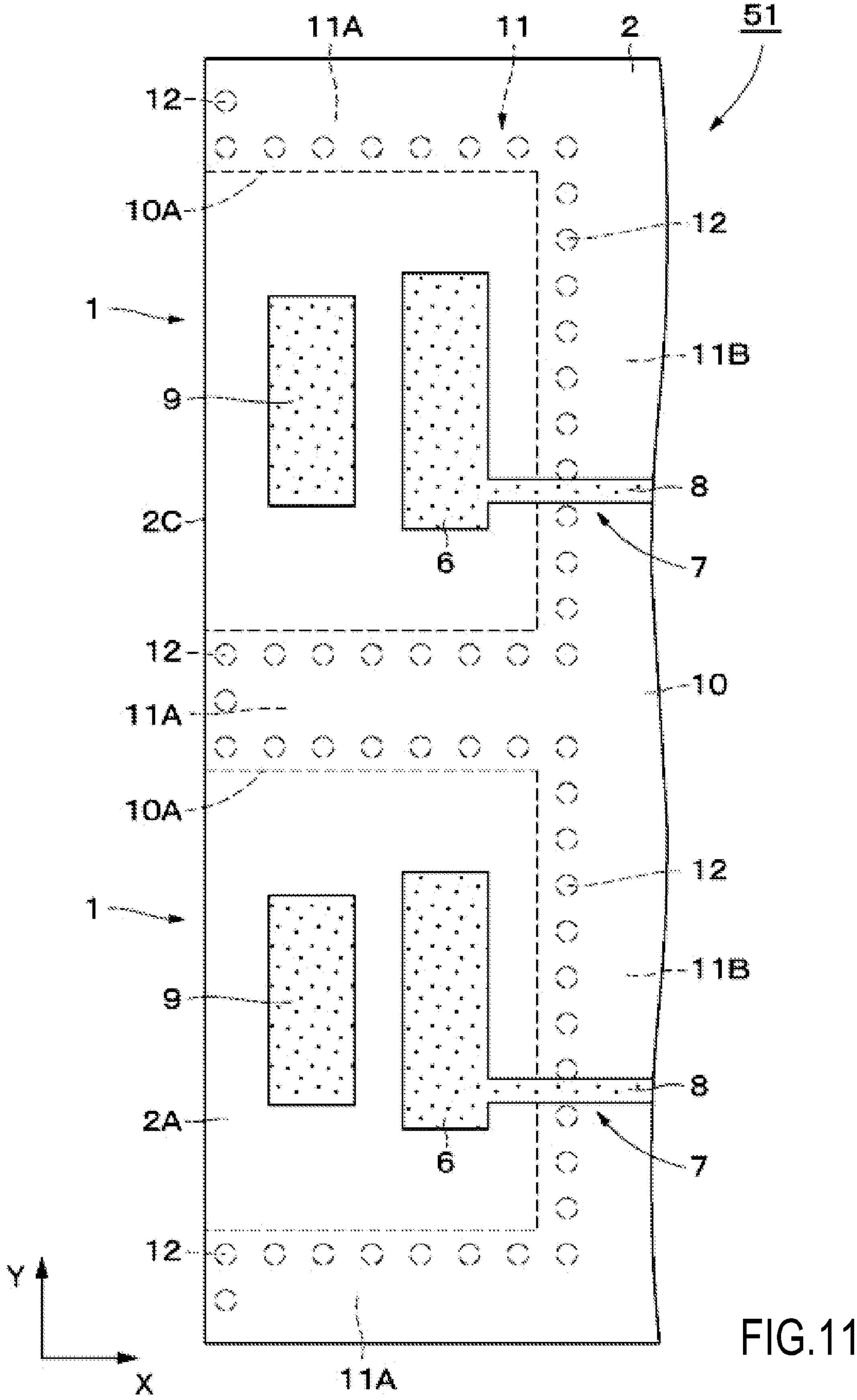
FIG. 11 is a plan view illustrating an array antenna according to a fifth exemplary embodiment.

Next, FIG. 11 illustrates a fifth exemplary embodiment. In addition, the feature of the present embodiment exists in that two horizontal radiation antennae are disposed next to each other in the width direction, thereby configuring an array antenna. In addition, in the present embodiment, configuration elements having a same symbol as assigned a configuration element in the first embodiment are described above with respect to the first embodiment, and that description may not be repeated here.

As shown in FIG. 11, two horizontal radiation antennae 1 according to the first embodiment are disposed next to each other in the Y axis direction, and hence an array antenna 51 according to the fifth embodiment is formed. In the two horizontal radiation antennae 1, power feeding is performed on the radiation elements 6 through the microstrip lines 7. The phases of the power feeding for the two microstrip lines 7 are allowed to mutually change. Accordingly, it may be possible to change the radiation direction of an electromagnetic wave in response to the phases of the power feeding for the two microstrip lines 7.

Accordingly, in the fifth exemplary embodiment, it may also be possible to obtain a similar function effect as the first embodiment. In particular, in the fifth embodiment, since the two horizontal radiation antennae 1 are disposed next to each other in the Y axis direction, thereby configuring the array antenna 51, it may be possible to change the radiation direction of an electromagnetic wave by changing the phases of the power feeding for the two microstrip lines 7.

In addition, while, in the fifth exemplary embodiment, the array antenna 51 is configured using the two horizontal radiation antennae 1, the array antenna may also be configured using more than two horizontal radiation antennae. In addition, while, in the fifth exemplary embodiment, a configuration is adopted in which the horizontal radiation antenna 1 according to the first embodiment is used, a configuration may also be adopted in which any one of the horizontal radiation antennae 21, 31, and 41 according to the second to the fourth exemplary embodiments, respectively, is used.

Figure 12:
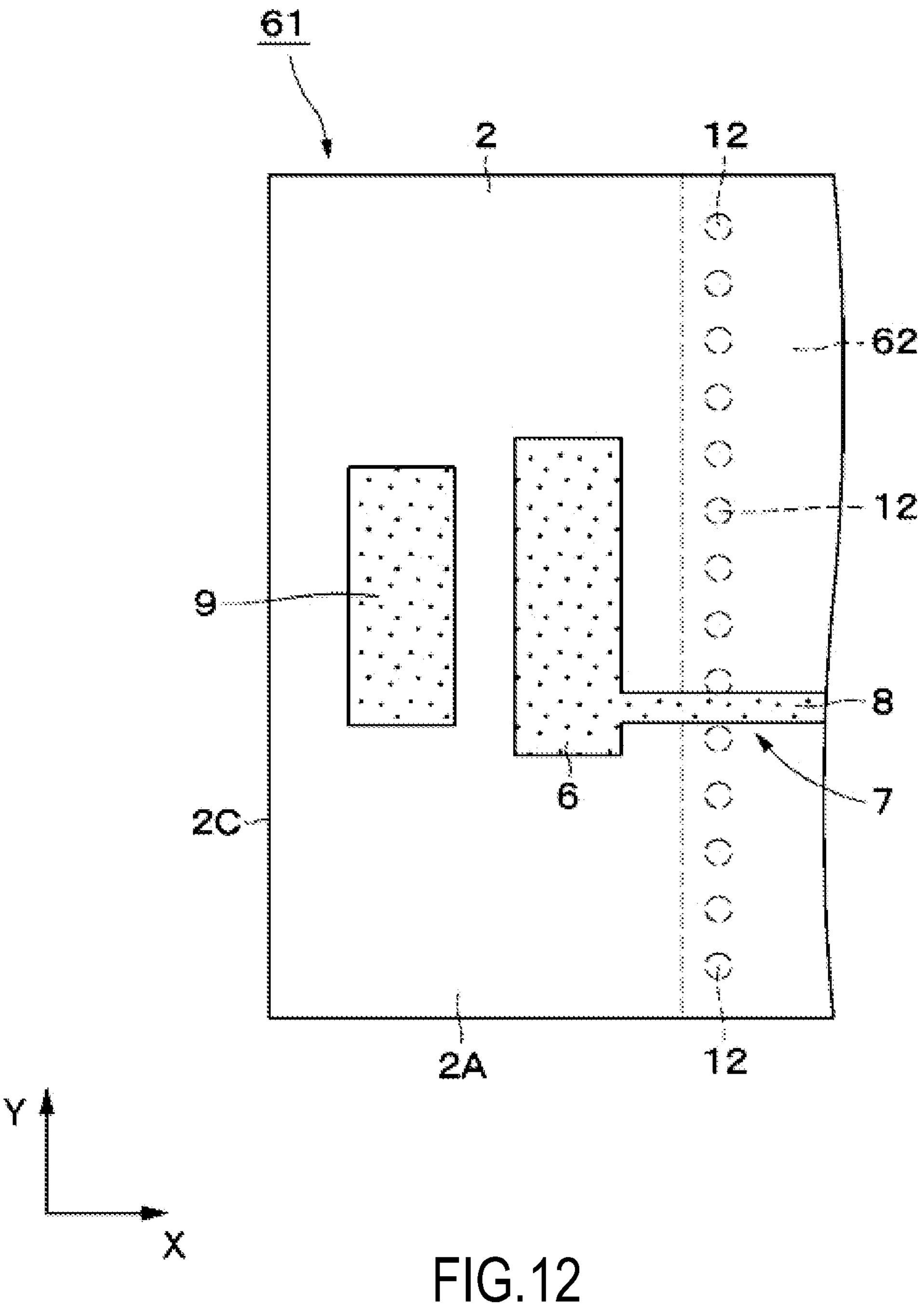
FIG. 12 is a plan view illustrating a horizontal radiation antenna according to a first example of a modification.

In addition, in the individual embodiments described above, configurations are adopted in which the substantially U-shaped frame portions 11, 35, and 43 surrounding the radiation element 6 and the passive elements 9, 22, 32, and 33 are provided in the intermediate grounded conductor plates 10, 34, and 42. However, preferred embodiments of the present invention are not limited to the above-mentioned embodiments, for example, FIG. 12 shows a horizontal radiation antenna 61 formed to have an intermediate grounded conductor plate 62 uniform with respect to the Y axis direction, as a first example of a modification of the above-described embodiments. In this case, compared with the end portion 2C of the multilayer substrate 2, the intermediate grounded conductor plate 62 is located on a base end side in the X axis direction, and disposed at a position facing the strip conductor 8 without facing the radiation element 6 and the passive element 9. In addition, in the intermediate grounded conductor plate 62, plural vias 12 are provided next to each other in the Y axis direction, in a level-difference portion between the intermediate grounded conductor plate 62 and the grounded conductor plate 5.

Figure 13:
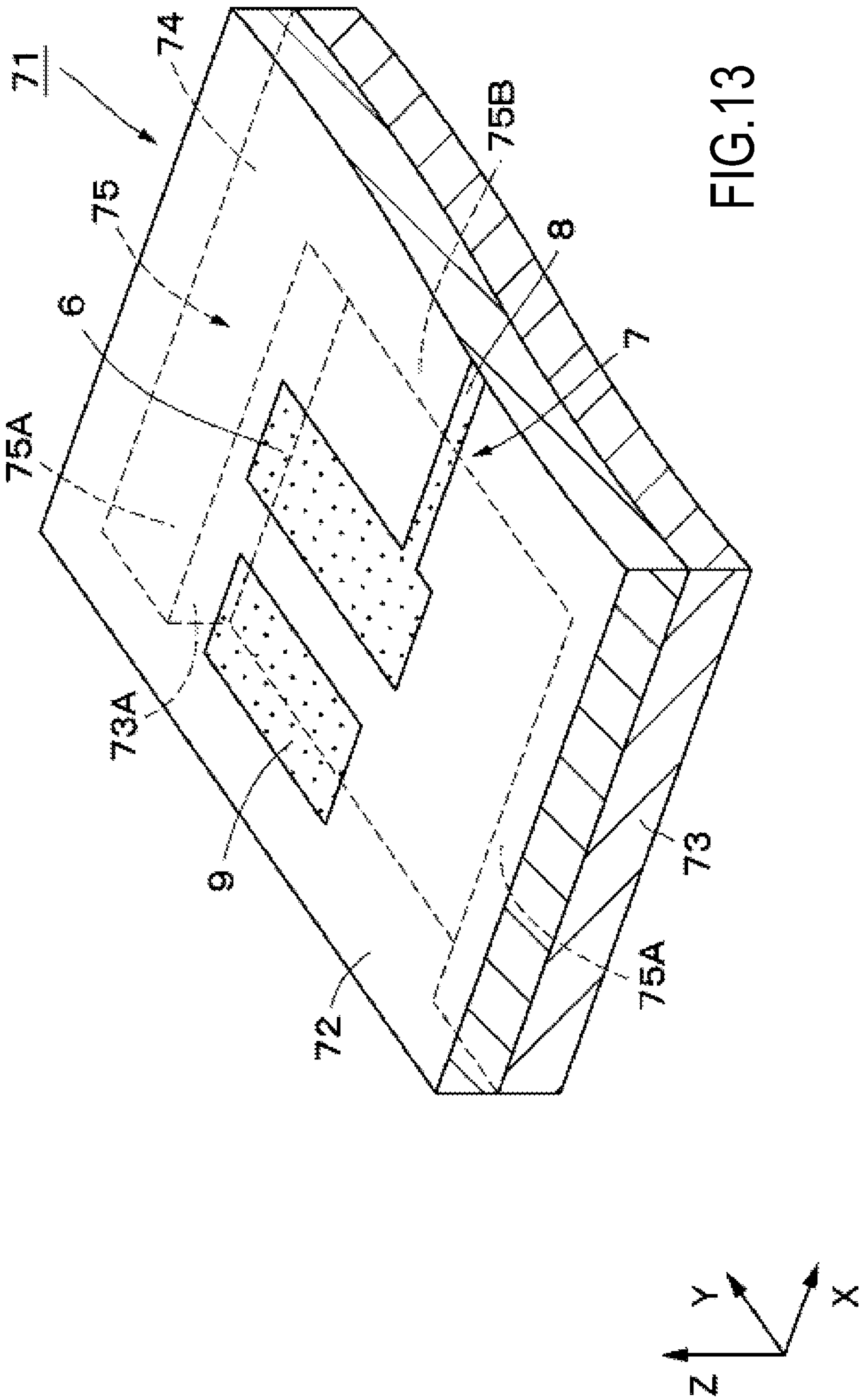
FIG. 13 is a perspective view illustrating a horizontal radiation antenna according to a second example of a modification.
Figure 14:
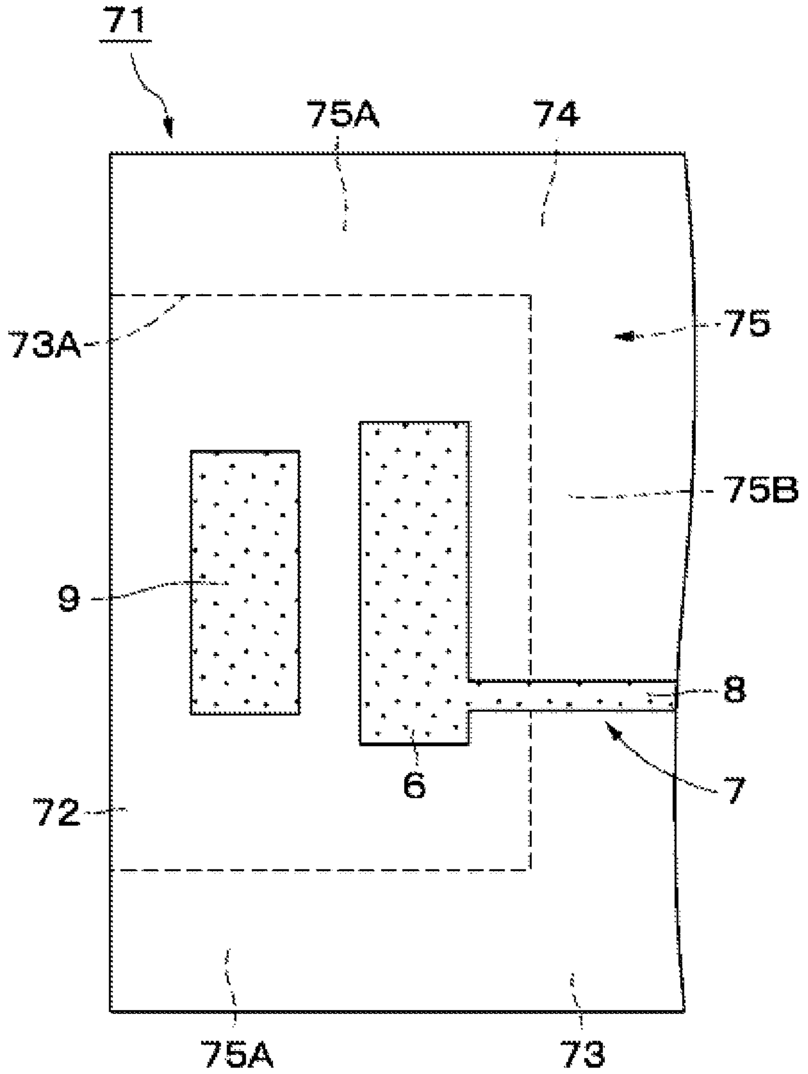
FIG. 14 is a plan view illustrating the horizontal radiation antenna in FIG. 13.
Figure 15:
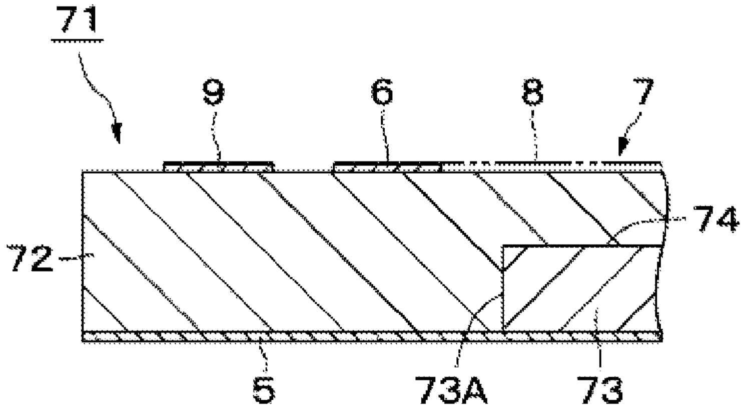
FIG. 15 is a cross-sectional view of a similar position as in FIG. 3, which illustrates the horizontal radiation antenna in FIG. 13.

In addition, in the individual embodiments, cases in which the horizontal radiation antennae 1, 21, 31, and 41 are formed in the multilayer substrate 2 have been cited as examples and described. However, preferred embodiments of the present invention are not limited to these cases, for example, FIGS. 13 to 15 show a horizontal radiation antenna 71 formed using a single substrate 72, as a second example of a modification of the above-described exemplary embodiments. In this case, for example, a conductor plate 73 whose thickness dimension is large is embedded in the substrate 72, and an intermediate grounded conductor plate 74 is formed using the front surface of the conductor plate 73. In addition, using the end surface of the conductor plate 73, a wall surface of a level-difference portion between the intermediate grounded conductor plate 74 and the grounded conductor plate 5 is formed. Furthermore, in the conductor plate 73, a notch portion 73A may also be formed that has approximately a similar shape as that of the notch portion 10A according to the first embodiment, and a substantially U-shaped frame portion 75 may also be formed that includes two arm portions 75A and a joining portion 75B so as to surround the notch portion 73A.

In addition, while, in the individual embodiments, a case has been cited as an example and described in which the microstrip line 7 is used as a feeding line, a configuration may also be adopted in which a strip line or the like is used, for example.

In addition, while, in the individual embodiments, the horizontal radiation antenna used for a millimeter wave of about a 60 GHz band has been cited as an example and described, the embodiments may also be applied to a horizontal radiation antenna used for a millimeter wave of another frequency band, a microwave, or the like.

In embodiments consistent with the present disclosure, because the passive element is provided in a state in which the passive element is parallel to the radiation element, the passive element serves as an inducer. Therefore, it may be possible to obtain a directivity in the direction of the passive element when being viewed from the radiation element, and it may be possible to radiate an electromagnetic wave from the end portion side of the substrate in a horizontal direction parallel to the substrate. In addition, since the radiation element is provided at a position facing the grounded conductor plate, it may be possible to perform power feeding on the radiation element without using a balun electrode. In addition to this, it may be possible to radiate an electromagnetic wave without using a conductor cover. Therefore, it may be possible to downsize the whole antenna compared with a case in which the balun electrode or the conductor cover is used.

In addition, a configuration is adopted in which the intermediate grounded conductor plate is formed where the level difference is formed between the intermediate grounded conductor plate and the grounded conductor plate and the distance dimension between the grounded conductor plate and the radiation element is large compared with the distance dimension between the intermediate grounded conductor plate and the conductor pattern of the feeding line. Compared with a feeding line side, it may be easy for a radiation element side to radiate an electromagnetic wave. In addition to this, since the intermediate grounded conductor plate is provided where the level differences are formed between the intermediate grounded conductor plate and the grounded conductor plate, these level-difference portions serve as a reflector. As a result, it may be possible to improve a characteristic of radiating to the end portion side of the substrate, on which the passive element is disposed when being viewed from the radiation element. Furthermore, since an electromagnetic wave may be reflected by the level-difference portion between the grounded conductor plate and the intermediate grounded conductor plate, it may be possible to prevent electric power from leaking into the inside of the substrate.

In embodiments in which the intermediate grounded conductor plate includes a substantially U-shaped frame portion surrounding the radiation element and the passive element in a substantially U-shaped form in a state in which the end portion side of the substrate is open, the radiation element and the passive element in a state in which the end portion side of the substrate is open, the level-difference portion between the grounded conductor plate and the intermediate grounded conductor plate is also formed in a substantially U-shaped form. Therefore, it may be possible to radiate an electromagnetic wave to the end portion side of the substrate, on which the substantially U-shaped frame portion is open, and in addition to this, it may be possible to prevent an electromagnetic wave from diverging into both end portion sides in the width direction in which the substantially U-shaped frame portion is open. Accordingly, it may be possible to improve a characteristic of radiating to the direction of the passive element when being viewed from the radiation element.

In embodiment in which the feeding line is configured using a microstrip line including a strip conductor where the conductor pattern is provided on the front surface of the substrate, because the feeding line is configured using the microstrip line usually used in a high-frequency circuit, it may be possible to easily connect the high-frequency circuit and the antenna to each other.

In embodiments in which the substrate includes a multilayer substrate in which a plurality of insulation layers are laminated, the grounded conductor plate, the radiation element, and the intermediate grounded conductor plate are disposed at positions different from one another with respect to a thickness direction of the multilayer substrate, and the grounded conductor plate and the intermediate grounded conductor plate are electrically connected to each other using a plurality of vias penetrating the insulation layer located between the grounded conductor plate and the intermediate grounded conductor plate. As a result, while the grounded conductor plate is provided on the back surface of the multilayer substrate, and the radiation element is provided on the front surface of the multilayer substrate, the intermediate grounded conductor plate is provided between the insulation layers. Accordingly, it may be possible to easily dispose the intermediate grounded conductor plate between the grounded conductor plate and the radiation element with respect to the thickness direction. In addition to this, the grounded conductor plate and the intermediate grounded conductor plate are electrically connected to each other using the plural vias penetrating the insulation layer located between the grounded conductor plate and the intermediate grounded conductor plate. Therefore, the plural vias are disposed in the level-difference portion between the grounded conductor plate and the intermediate grounded conductor plate, and using these vias, it may be possible to reflect an electromagnetic wave headed into the inside of the substrate. In addition, conductor patterns are formed in the insulation layers, via processing is performed on the insulation layers, the plural insulation layers are stacked, and hence it may be possible to form the antenna. Therefore, it may be possible to easily apply this technology to a mass production line.

While exemplary embodiments of the disclosure have been described above, it is to be understood that variations and modifications will be apparent to those skilled in the art without departing from the scope and spirit of the disclosure.

What is claimed is:

1. A horizontal radiation antenna comprising:

a substrate including an insulating material;

a conductor plate on a back surface side of the substrate and configured to be connected to ground;

an elongated radiation element on a front surface side of the substrate, facing the conductor plate, and spaced from the conductor plate;

a feeding line including a conductor pattern on the front surface side of the substrate and connected to the radiation element;

at least one passive element on the substrate and located on an end portion side of the substrate compared with the radiation element, said passive element extending in parallel with the radiation element and insulated from the conductor plate and the radiation element;

and an intermediate conductor plate in the substrate at a position facing the feeding line between the front surface side of the substrate and the conductor plate, and configured to be connected to the ground, wherein a level difference is formed between the intermediate conductor plate and the conductor plate, a distance dimension between the conductor plate and the radiation element is larger than a distance dimension between the intermediate conductor plate and the conductor pattern of the feeding line, the intermediate conductor plate has a substantially U-shaped frame portion surrounding a notch portion positioned on the end portion side of the substrate, the radiation element and the passive element are disposed within the notch portion, the substrate includes a multilayer substrate in which plural insulation layers are laminated, the conductor plate, the radiation element, and the intermediate conductor plate are at positions different from one another with respect to a thickness direction of the multilayer substrate, and plural vias penetrate one of the plural insulation layers located between the conductor plate and the intermediate conductor plate and electrically connect the conductor plate and the intermediate conductor plate.

2. The horizontal radiation antenna according to claim 1, wherein the substantially U-shaped frame portion surrounds the radiation element and the passive element in a substantially U-shaped form in a state in which the end portion side of the substrate is open.

3. The horizontal radiation antenna according to claim 1, wherein the feeding line is configured using a microstrip line including a strip conductor where the conductor pattern is provided on the front surface of the substrate.

4. The horizontal radiation antenna according to claim 2, wherein the feeding line is configured using a microstrip line including a strip conductor where the conductor pattern is provided on the front surface of the substrate.

5. The horizontal radiation antenna according claim 1, wherein the conductor plate and the intermediate conductor plate are connected to ground.

* * * * *